(12) United States Patent
Dong et al.

(10) Patent No.: US 8,139,542 B2
(45) Date of Patent: Mar. 20, 2012

(54) CELL TIMING ACQUISITION IN A W-CDMA HARD HANDOVER

(75) Inventors: Brian Dong, Tucson, AZ (US); Messay Amerga, San Diego, CA (US); Supratik Bhattacharjee, San Diego, CA (US); Xiaoming Zhu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 12/239,027

(22) Filed: Sep. 26, 2008

(65) Prior Publication Data

US 2010/0080192 A1 Apr. 1, 2010

(51) Int. Cl.
*H04W 4/00* (2009.01)
(52) U.S. Cl. .................. 370/332; 370/242; 455/436
(58) Field of Classification Search .................. 370/324, 370/331, 332, 338, 350, 242; 375/134, 137, 375/149; 455/436, 439, 442
See application file for complete search history.

(56) References Cited

U.S. PATENT DOCUMENTS

| 7,133,702 | B2 | 11/2006 | Amerga et al. | |
|---|---|---|---|---|
| 7,411,983 | B2 | 8/2008 | Jo et al. | |
| 2003/0095516 | A1* | 5/2003 | Ok et al. | 370/331 |
| 2009/0163204 | A1* | 6/2009 | Farnsworth et al. | 455/434 |

FOREIGN PATENT DOCUMENTS

WO WO03019808 3/2003

OTHER PUBLICATIONS

International Search Report and Written Opinion—PCT/US2009/058656, International Search Authority—European Patent Office—Feb. 18, 2010.

* cited by examiner

*Primary Examiner* — Ricky Ngo
*Assistant Examiner* — Kan Yuen
(74) *Attorney, Agent, or Firm* — Kevin T. Cheatham

(57) ABSTRACT

Cell timing is detected by first trying to detect a target handover cell through detecting a primary synchronization channel (P-SCH) followed by a common pilot channel (CPICH). If that fails, N number of retrials is performed using a full-window search on the CPICH. The full-window CPICH search is performed blindly, without any slot timing information from the P-SCH. Performance is improved while maintaining the benefits of faster acquisition methods in good channel conditions. The full-window search is more time consuming, but takes advantage of the stronger CPICH transmission. In good channel conditions, a mobile device can proceed quickly with the normal method of timing acquisition. With failure, the mobile device can switch to the longer search which has a higher probability of successfully completing the hard handover procedure. The overall effect is a higher success rate of hard handovers without a uniform increase of time spent in cell timing acquisition.

17 Claims, 9 Drawing Sheets

CELL TIMING ACQUISITION IN A W-CDMA HARD HANDOVER

FIELD OF INVENTION

The present description pertains to inter-frequency hard handovers of user equipment, and more particularly to such handovers in a poor channel conditions that can frustrate synchronization to a target cell.

BACKGROUND

When a mobile device is directed by the network to perform a hard handover from one cell to another, it must quickly obtain the timing of the target handover cell so that user traffic can be reestablished. A number of circumstances can make inter-frequency hard handover necessary. For example, hotspot scenarios are where a cell uses more carriers than the surrounding cells. For another example, hierarchical cell structures are where macro, micro, and pico layers are on different frequencies. For an additional example, a handover can be made between different operators. For a further example, a handover can be made between different radio access technologies systems (e.g., UMTS TDD, UMTS FDD, and GSM).

The target handover cell is specified by its frequency and Primary Scrambling Code (PSC). Typically, this is accomplished by first searching the Primary Synchronization Channel (P-SCH) to detect slot-level timing, then using the slot timing hypothesis and specified PSC to detect the Common Pilot Channel (CPICH) over a relatively small search window. The search window can be smaller for CPICH because of the P-SCH detected timing. In many network configurations, the P-SCH channel power level is significantly weaker than the CPICH. In challenging channel conditions, it may be extremely difficult for the mobile to detect the P-SCH channel. The invention improves hard handover performance in challenging channel conditions by dynamically switching between traditional and advanced timing acquisition techniques when the first attempt to obtain cell timing has failed.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with detecting cell timing in challenging channel conditions by first trying to detect a target handover cell through detecting a primary synchronization channel (P-SCH) followed by a common pilot channel (CPICH). If that fails, N number of retrials is performed using a full-window search on the CPICH. The full-window CPICH search is advantageously performed blindly, without any slot timing information from the P-SCH. Performance is improved while maintaining the benefits of faster acquisition methods in good channel conditions. The full-window search is more time consuming, but takes advantage of the stronger CPICH transmission. In good channel conditions, a mobile device can proceed quickly with the normal method of timing acquisition. In the event of failure, the mobile device can switch to the longer search which has a higher probability of successfully completing the hard handover procedure. The overall effect is a higher success rate of hard handovers without a uniform increase of time spent in cell timing acquisition.

In one aspect, a method performs inter-frequency hard handover in a challenging channel quality environment. Acquiring a synchronization channel of a target base node is attempted to determine slot timing followed by a partial window search of a common pilot channel to determine cell timing. A failure to acquire the target base node is determined. A full-window search of the common pilot channel (CPICH) is performed blindly without slot timing information in order to acquire the target base note with a higher success rate during hard handovers without a uniform increase of time spent in cell timing acquisition.

In another aspect, at least one processor performs inter-frequency hard handover in a challenging channel quality environment. A first module attempts to acquire a synchronization channel of a target base node to determine slot timing followed by a partial window search of a common pilot channel to determine cell timing. A second module determines a failure to acquire the target base node. A third module performs a full-window search of the common pilot channel (CPICH) blindly without slot timing information in order to acquire the target base note with a higher success rate during hard handovers without a uniform increase of time spent in cell timing acquisition.

In an additional aspect, a computer program product performs inter-frequency hard handover in a challenging channel quality environment. A computer-readable storage medium comprises a first set of codes for causing a computer to attempt to acquire a synchronization channel of a target base node to determine slot timing followed by a partial window search of a common pilot channel to determine cell timing. A second set of codes causes the computer to determine a failure to acquire the target base node. A third set of codes causes the computer to perform a full-window search of the common pilot channel (CPICH) blindly without slot timing information in order to acquire the target base note with a higher success rate during hard handovers without a uniform increase of time spent in cell timing acquisition.

In a further aspect, an apparatus performs inter-frequency hard handover in a challenging channel quality environment. Means are provided for attempting to acquire a synchronization channel of a target base node to determine slot timing followed by a partial window search of a common pilot channel to determine cell timing. Means are provided for determining a failure to acquire the target base node. Means are provided for performing a full-window search of the common pilot channel (CPICH) blindly without slot timing information in order to acquire the target base note with a higher success rate during hard handovers without a uniform increase of time spent in cell timing acquisition.

In yet another aspect, an apparatus performs inter-frequency hard handover in a challenging channel quality environment. A receiver attempts to acquire a synchronization channel of a target base node to determine slot timing followed by a partial window search of a common pilot channel to determine cell timing. A controller determines a failure to acquire the target base node. The receiver performs a full-window search of the common pilot channel (CPICH) blindly without slot timing information in order to acquire the target base note with a higher success rate during hard handovers without a uniform increase of time spent in cell timing acquisition.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
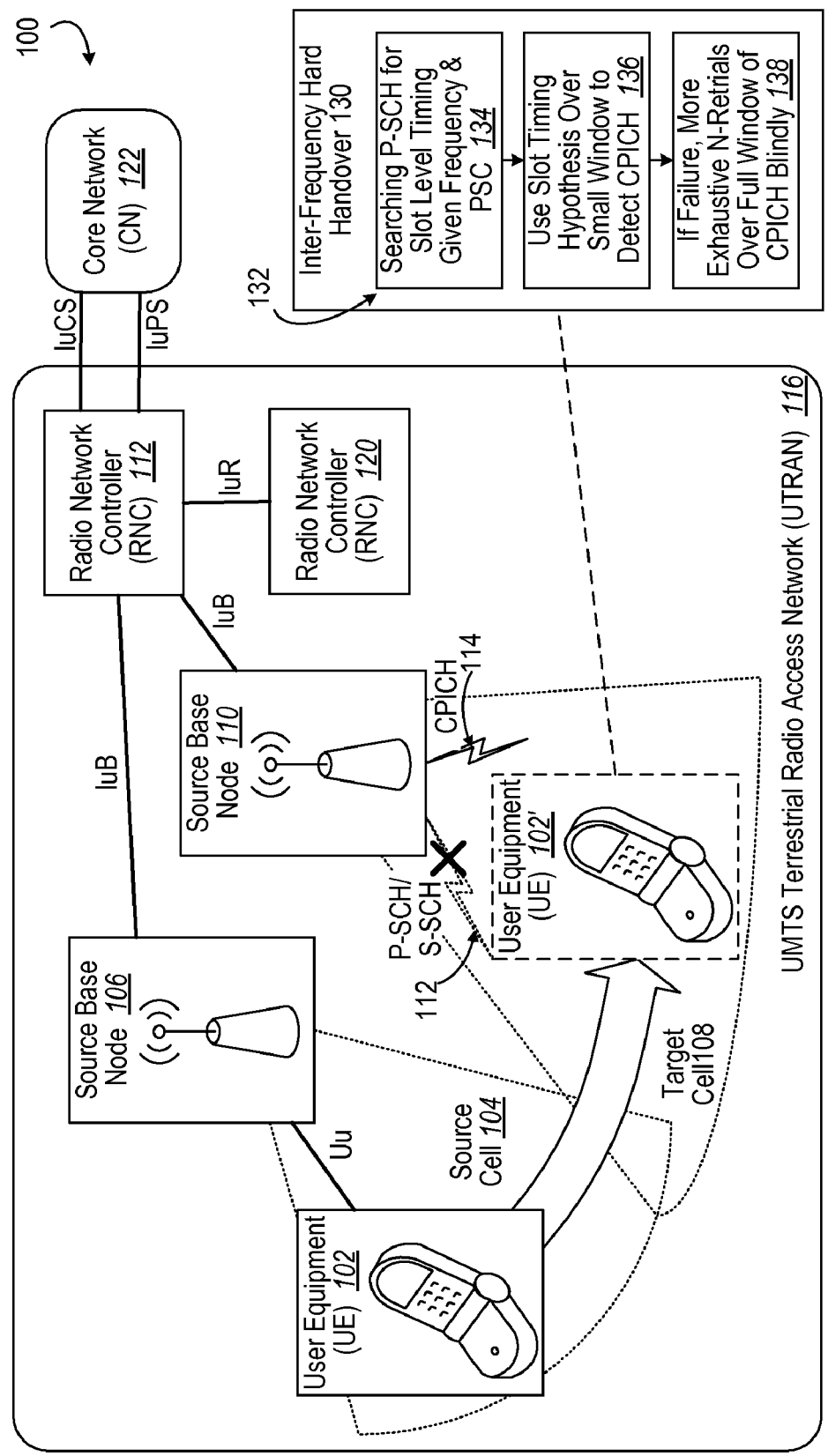
FIG. 1 illustrates a block diagram of a wireless communication system of a user equipment (UE) moving from a coverage area of source radio access network (RAN) to a neighboring RAN warranting an inter-frequency hard handover.

In Wideband Code Division Multiple Access (WCDMA) systems, some of the synchronization channels such as the Primary Synchronization Channel (P-SCH), the Secondary Synchronization Channel (S-SCH) and the Common Pilot Channel (CPICH) are used to find and to detect new cells. When both a current cell and a target cell are on the same frequency, an intra-frequency cell acquisition and synchronization is performed by using a three-step process: First, the P-SCH is used to detect a new cell. Second, when a new cell has been detected, the S-SCH is used to find the timing and the scrambling code group of the new cell. Third, when the timing of the new cell has been found, the CPICH is used for measuring the signal strength of the new cell.

However, when the current cell and target cell are on different frequencies, then an inter-frequency cell acquisition and synchronization is performed. The second step of using the S-SCH for timing and scrambling code group is not performed due to the rather lengthy time required and the frequent limitation of devices of being single mode. Thus, inter-frequency handover detects P-SCH for slot timing followed by CPICH. Advantageously, upon failure to acquire the cell timing, a blind full window is made without benefit of slot timing information of the CPICH in order to increase the success of completing an inter-frequency hard handover.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. or may not include all of the components, modules, etc. discussed in connection with the figures. A combination of these approaches may also be used. The various aspects disclosed herein can be performed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

Referring initially to FIG. 1, a communication system 100 supports inter-frequency hard handover as a user equipment (UE) 102 in a source cell 104 of a source base node 106 moves to a target cell 108 of a target base node 110 as depicted at 102'. The UE 102 acquires W-CDMA protocol communications, specifically synchronization channels 112 (i.e., primary synchronization channel (P-SCH) and secondary synchronization channel (S-SCH)) and a common pilot channel (CPICH) 114 in order to acquire and establish communication with the target base node 110.

Universal Mobile Telecommunications System (UMTS) is one of the third-generation (3G) cell phone technologies, which is also being developed into a 4G technology. Currently, the most common form of UMTS uses W-CDMA as the underlying air interface. It is standardized by the 3GPP, and is the European answer to the ITU IMT-2000 requirements for 3G cellular radio systems. To differentiate UMTS from competing network technologies, UMTS is sometimes marketed as 3GSM, emphasizing the combination of the 3G nature of the technology and the GSM standard which it was designed to succeed.

UTRAN 116, short for UMTS Terrestrial Radio Access Network, is a collective term for the base stations (Node B's) 106, 110 and Radio Network Controllers (RNC) 118, 120 that make up the UMTS radio access network 110. This communications network, commonly referred to as 3G (for 3rd Generation Wireless Mobile Communication Technology), can carry many traffic types from real-time Circuit Switched to IP based Packet Switched. The UTRAN 116 allows connectivity between the UE (user equipment) 102 and a core network 122. Each RNC 118, 120 provides control functionalities for one or more Node Bs 106, 110. A Node B 106, 110 and an RNC 118 can be the same device, although typical implementations have a separate RNC located in a central office serving multiple Node B's 106, 110. Despite the fact that they do not have to be physically separated, there is a logical interface between them known as the Iub. The RNC 118 and its corresponding Node Bs 106, 110 are called a Radio Network Subsystem (RNS) 124. There can be more than one RNS present in an UTRAN.

There are four interfaces connecting the UTRAN 116 internally or externally to other functional entities: Iu, Uu, Iub and Iur. The Iu interface is an external interface that connects the RNC to the Core Network (CN). The Uu is also external, connecting the Node B 102 with the User Equipment (UE) 102. The Iub is an internal interface connecting the RNC 118 with the Node B 106, 110. And at last there is the Iur interface which is an internal interface most of the time, but can, exceptionally be an external interface too for some network architectures. The Iur connects two RNCs 118, 120 with each other.

The UE 102 includes an inter-frequency hard handover apparatus 130 that performs a methodology 132 for acquiring the target cell 108. First, synchronization channel 112 is used to detect slot timing information (block 134). For instance, the P-SCH is used to detect a new cell. Then, when a new cell has been detected, the S-SCH is used to find the timing and the scrambling code group of the new cell. When the timing of the new cell has been found, the CPICH is used for measuring the signal strength of the new cell (block 136). Upon failure to acquire the cell timing, a blind full window search is made without benefit of slot timing information of the CPICH in order to increase the success of completing an inter-frequency hard handover (block 138).

Thus, when a UE 102 such as a mobile device is directed by the network 116 to perform a hard handover from one cell 104 to another 108, it must quickly obtain the timing of the target handover cell 108 so that user traffic can be reestablished. A number of circumstances can make inter-frequency hard handover necessary. For example, hot-spot scenarios are where a cell uses more carriers than the surrounding cells. For another example, hierarchical cell structures are where macro, micro, and pico layers are on different frequencies. For an additional example, a handover can be made between different operators. For a further example, a handover can be made between different radio access technologies systems (e.g., UMTS TDD, UMTS FDD, and GSM).

The target handover cell 108 is specified by its frequency and Primary Scrambling Code (PSC). Typically, this is accomplished by first searching the Primary Synchronization Channel (P-SCH) 112 to detect slot-level timing, then using the slot timing hypothesis and specified PSC to detect the Common Pilot Channel (CPICH) 114 over a relatively small search window. The search window can be smaller for CPICH 114 because of the P-SCH detected timing. In many network configurations, the channel power level of the P-SCH 112 is significantly weaker than the CPICH 114. In challenging channel conditions, it may be extremely difficult for the UE (mobile device) 102 to detect the P-SCH 112. Thereby, hard handover performance is improved in challenging channel conditions by dynamically switching between traditional and advanced timing acquisition techniques when the first attempt to obtain cell timing has failed.

Figure 2:
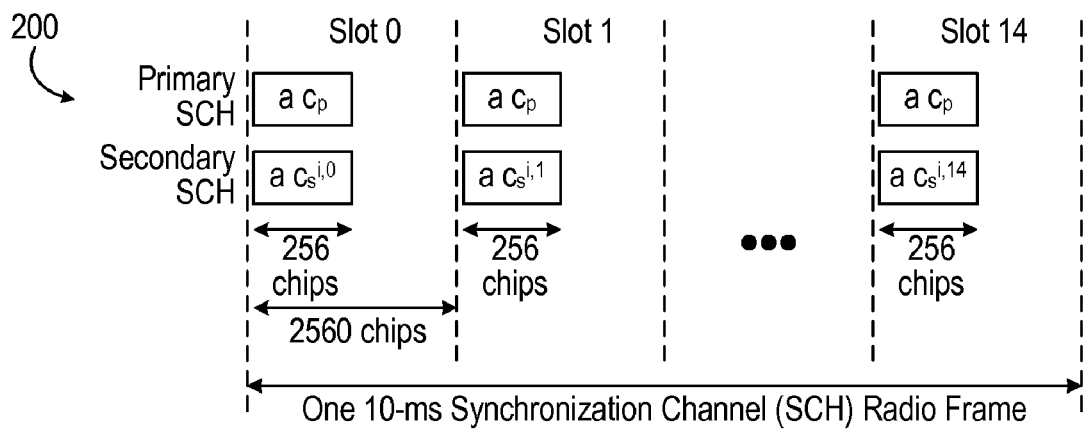
FIG. 2 illustrates a diagram of a synchronization channel.

In FIG. 2, aspects of synchronization channels are depicted at 200. The Synchronization Channel (SCH) is a downlink signal used for cell search. The SCH consists of two sub channels, the Primary and Secondary SCH. The 10 ms radio frames of the Primary and Secondary SCH are divided into 15 slots, each of length 2560 chips. Picture above illustrates the structure of the SCH radio frame. The Primary SCH consists of a modulated code of length 256 chips, the primary synchronization code (PSC) is transmitted once every slot. The PSC is the same for every cell in the system. The Secondary SCH consists of repeatedly transmitting a length 15 sequence of modulated codes of length 256 chips, the Secondary Synchronization Codes (SSC), transmitted in parallel with the Primary SCH. The SSC is denoted $c_s^{i,k}$, where i=0, 1, . . . , 63 is the number of the scrambling code group, and k=0, 1, . . . , 14 is the slot number. Each SSC is chosen from a set of 16 different codes of length 256. This sequence on the Secondary SCH indicates which of the code groups the cell's downlink scrambling code belongs to.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 3:
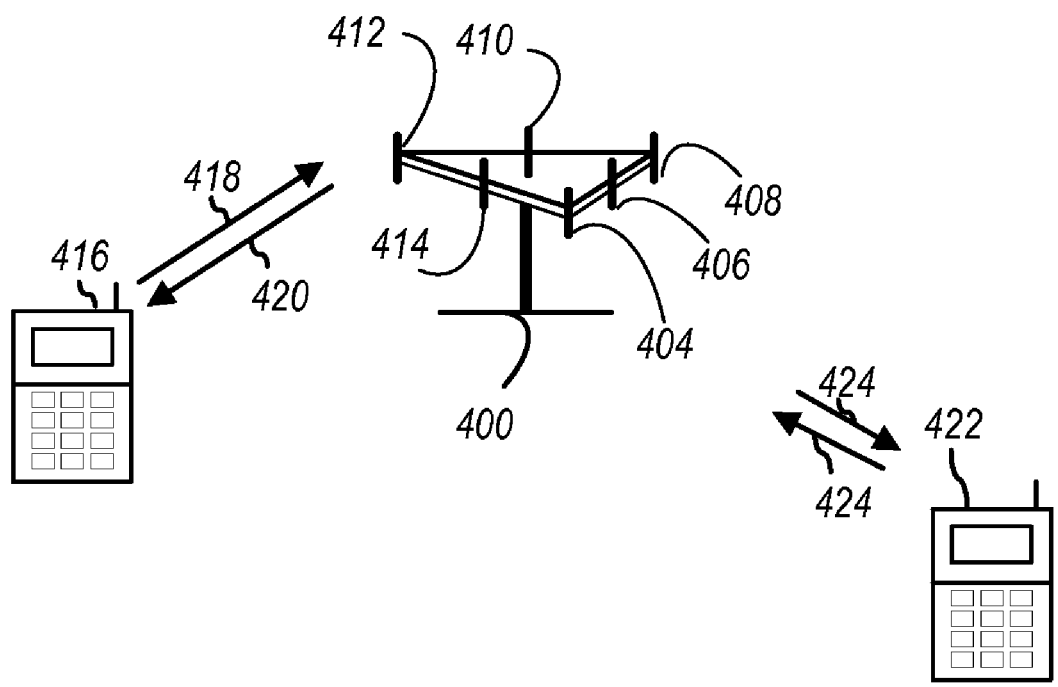
FIG. 3 illustrates a block diagram of a communication system enhanced to support handovers.

Referring to FIG. 3, a multiple access wireless communication system according to one aspect is illustrated. An access point 400 (AP) includes multiple antenna groups, one including 404 and 406, another including 408 and 410, and an additional including 412 and 414. In FIG. 3, only two antennas are shown for each antenna group, however, more or fewer antennas may be utilized for each antenna group. Access terminal 416 (AT) is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 424. In addition, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 4:
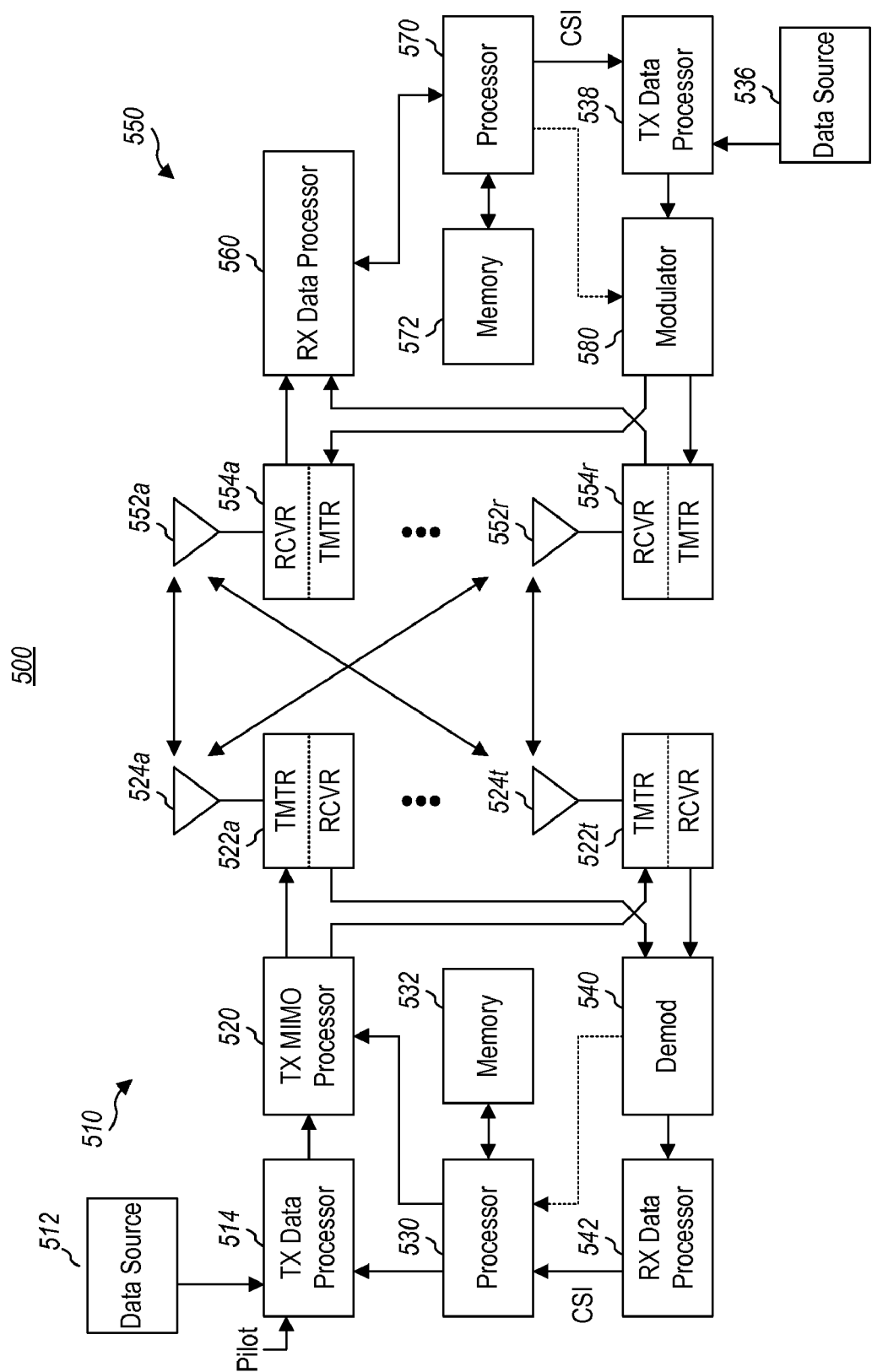
FIG. 4 illustrates a diagram of a multiple access wireless communication system according to one aspect for supporting handovers.

FIG. 4 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using CDMA techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for CDMA). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels can comprise a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises Common Pilot Channel (CPICH); Synchronization Channel (SCH); Common Control Channel (CCCH); Shared DL Control Channel (SD-CCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and Load Indicator Channel (LICH).

The UL PHY Channels comprises Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and Broadband Pilot Channel (BPICH).

The Primary SCH enables synchronization of chip, slot, and symbol and is comprised of 256 chips that are the same in all cells. The secondary SCH provides frame synchronization and code group (i.e., one of 64) and is a 15-code sequence of secondary synchronization codes. There are 64 S-SCH sequences corresponding to the 64 scrambling code groups. The 256 chips are different for different cells and slot intervals. The CPICH is one of eight scrambling codes used to find the primary scrambling code. The PCCPCH (Primary Common Control Physical Channel) is for super frame synchronization and BCCH information that is a fixed 30 kbps channel at a 27 kbps rate with a spreading factor 256. The SCCPCH (Secondary Common Control Physical Channel) carries FACH and PCH channels at a variable bit rate.

Figure 5:
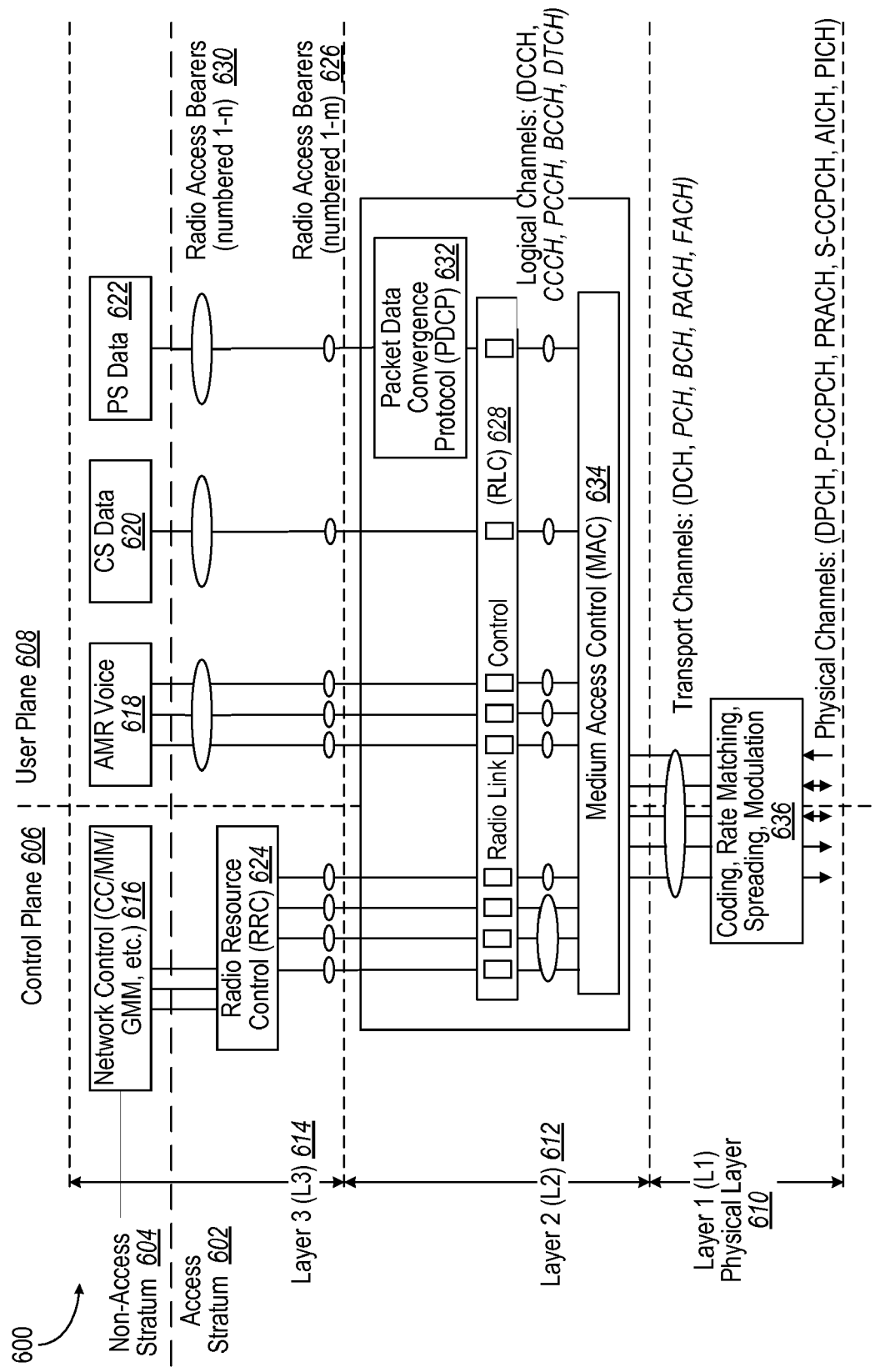
FIG. 5 illustrates a diagram of a W-CDMA Protocol Structure.

In FIG. 5, an illustrative W-CDMA Protocol Structure 600 has a layered structure designed to give the system a great deal of flexibility. The two major parts are the Core Network (CN) and Radio Access Network (RAN), as depicted in FIG. 1. The structure of the RAN and the relationship of several key terms to it are illustrated in W-CDMA Protocol Structure 600. It is important to recognize that this figure is only an illustration. The exact structure, including the number and type of channels, number and type of user services, and the configuration of blocks in the structure will vary over time to meet the current needs of the system. The structures of the uplink and downlink are very similar; however, some types of channels exist in only one direction; while others exist in both.

The WCDMA structure 600 is divided vertically into an "Access Stratum" 602 and a "Non-Access Stratum" 604, and horizontally into a "Control Plane" 606 and a "User Plane" 608. Protocol Layers 1 (L1) 610 and 2 (L2) 612 are in the Access Stratum 602. Protocol Layer three (L3) 614 is divided between the Access and Non-Access strata 602, 604. In layers 2 and 3 610, 612 control plane and user plane information is carried on separate channels. Within layer 1 612, some channels carry only control plane information, while others carry both user and control plane data.

The non-access stratum 604 in an illustrative aspect comprises a network control 616, on the control plane 606, for functions such as call control (CC), mobile management (MM), GPRS Mobility Management (GMM), etc. On the user plane 608, the non-access stratum 604 includes adaptive multi-rate (AMR) voice component 618, circuit switched (CS) component 620, and packet service (PS) component 622.

In the L3 614 of the access stratum 602, communication from the network control 616 pass through a radio resource control (RRC) 624 and through radio access bearers 626 to a Radio Link Control (RLC) 628 of the L2 612. AMR voice component 618, CS data component 620, and PS component 622 pass through radio access bearers 630 (1-$n$), through radio access bearers (1-$m$) 626 to a packet data convergence protocol (PDCP) component 632, and to the RLC 628 of L2 612. Continuing with the L2 layer 612, logical channels (DCCH, CCCH, PCCH, BCCH, and DTCH) pass to medium access control (MAC) 634. In turn, the MAC 634 communicates via transport channels (DCH, PCH, BCH, RACH, FACH) with a coding, rate matching, spreading and modulation component 636 of the L1 610, which in turn communicates over-the-air via physical channels (DPCH, P-CCPCH, PRACH, S-CCPCH, AICH, PICH).

The Radio Resource Control (RRC) belong to the UMTS WCDMA protocol stack and handles the control plane signaling of Layer 3 between the UEs (User Equipments) and UTRAN and perform functions for connection establishment and release, broadcast of system information, Radio Bearer establishment/reconfiguration and releases, RRC Connection mobility procedures, paging notification and release, outer loop power control.

Figure 6:
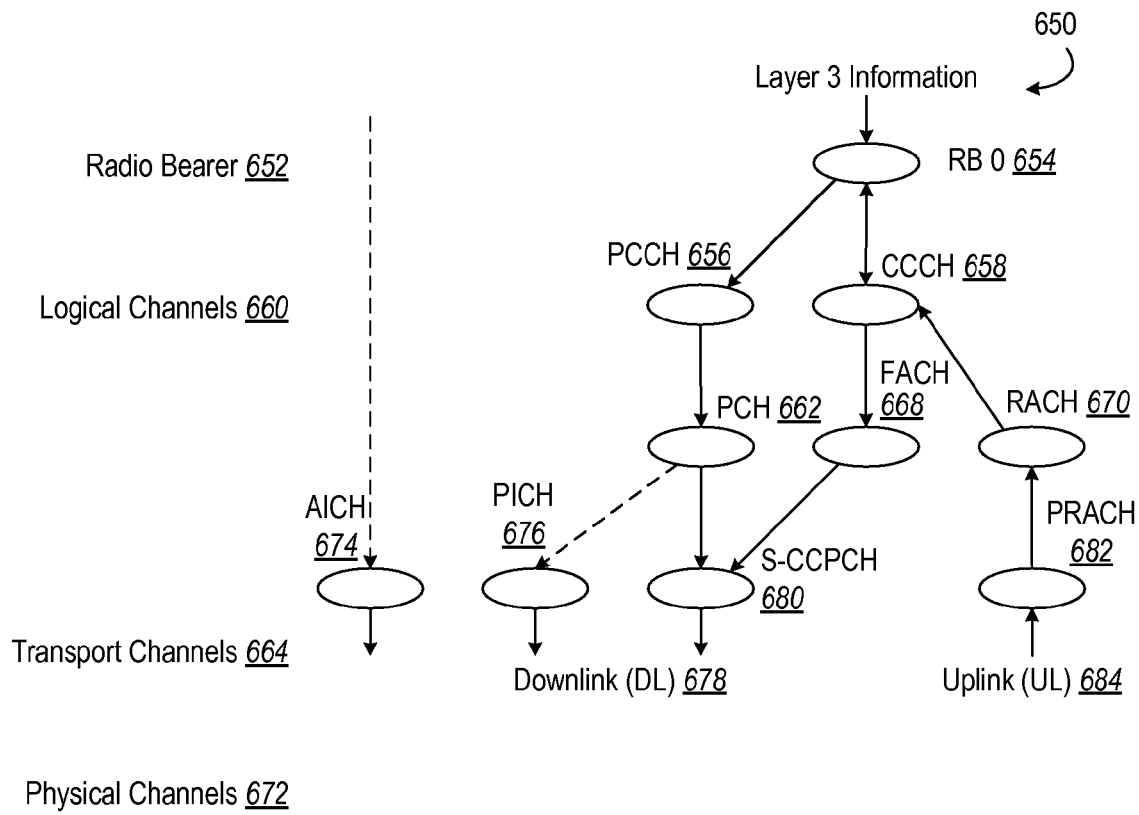
FIG. 6 illustrates communication channels for a communication device having a radio bearer (RB) level, logical channels, transport channels, and physical channels.

In FIG. 6, a depiction is made for a communication device 650 having a radio bearer (RB) level 652 with an RB0 654 that receives L3 information. One-way communication passes down to PCCH 656 and two-way communication is exchanged with CCCH 658, both of a logical channels level 660. The PCCH 656 passes one-way communication to PCH 662 of a transport channel level 664. The CCCH 658 sends one-way communication to FACH 668 and receives one-way communication from RACH 670, both of the transport channel level 664. A physical channel level 672 includes AICH 674, a PICH 676 that receives control from PCH 662 to be part of a downlink (DL) 678. In addition, S-CCPCH 680 receives communication from both PCH 662 and FACH 668 and is part of DL 678. The physical channel level 672 also has a PRACH 682 that receives inputs from an uplink (UL) 684 and that communicates to RACH 670.

Figure 7:
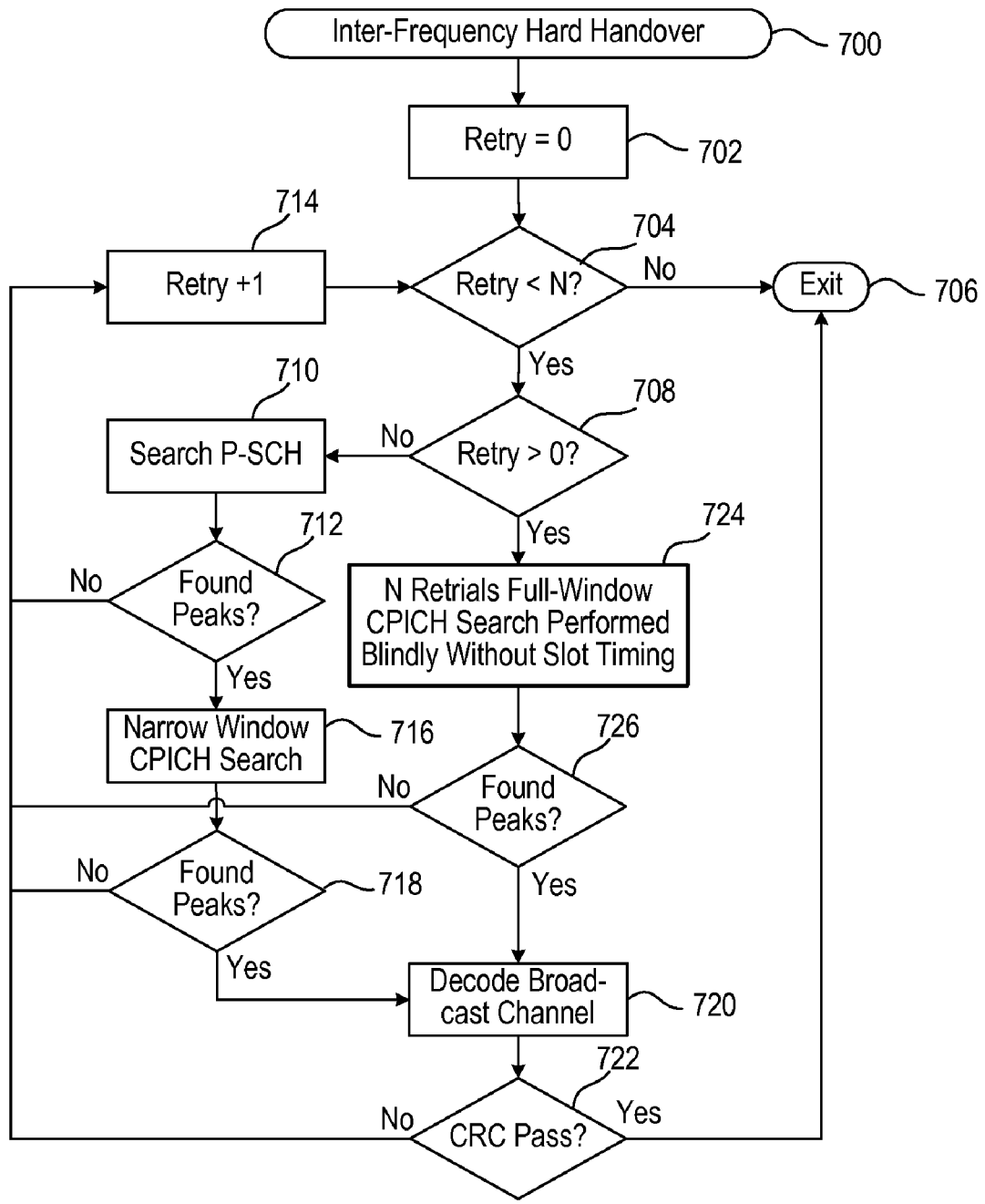
FIG. 7 illustrates a flow diagram of a methodology for inter-frequency hard handover.

In FIG. 7, a methodology for inter-frequency hard handover 700 is depicted. At block 702, a retry counter is set to zero (0). Then a determination is made at block 704 as to whether the retry counter is less than a number N of retries, which is selected to be sufficiently exhaustive for a high probability of target cell acquisition. If N retries is reached, then the methodology exists at block 706. If not, then a determination in block 708 is made as to whether in an initial condition (i.e., retry counter is at 0) exists. If so, an attempt to quickly acquire the target cell is attempted. This is depicted at block 710 as performing a search of P-SCH and then at block 712 as to whether peaks are found. If not, then the retry counter is incremented at block 714 and processing returns to block 704. If successful at block 710, then a narrow window CPICH search is performed at block 716. If peaks are determined not to have been found in the CPICH in block 718, then processing returns to 714 for more retries. If successful in block 718, then the broadcast channel (BCH) is decoded in block 720. If successful by determining whether cyclic redundancy check (CRC) passes in block 722, then the methodology 700 exits at block 706 and otherwise returns to block 714 for more retries.

To explain in another way this initial attempt at a cell search procedure, during the cell search, the UE searches for a cell and determines the downlink scrambling code and frame synchronization of that cell. The cell search is typically carried out in three phases. First is slot synchronization. During the first phase of the cell search procedure, the UE uses the SCH's primary synchronization code to acquire slot synchronization to a cell. This is typically done with a single matched filter (or any similar device) matched to the primary synchronization code which is common to all cells. The slot timing of the cell can be obtained by detecting peaks in the matched filter output. A second phase is for frame synchronization and code-group identification. During the second phase of the cell search procedure, the UE uses the SCH's secondary synchronization code to find frame synchronization and identify the code group of the cell found in the first step. This is done by correlating the received signal with all possible secondary synchronization code sequences, and identifying the maximum correlation value. Since the cyclic shifts of the sequences are unique the code group as well as the frame synchronization is determined. A third phase is for scrambling code identification. During the third phase of the cell search procedure, the UE determines the exact primary scrambling code used by the found cell. The primary scrambling code is typically identified through symbol-by-symbol correlation over the CPICH with all codes within the code group identified in the second step. After the primary scrambling code has been identified, the Primary CCPCH can be detected. And the system- and cell specific BCH information can be read. If the UE has received information about which scrambling codes to search for, phases 2 and 3 above can be simplified.

While often successful, in a challenging channel quality condition, the UE may not be able to successful detect these aspects of the synchronization channel. To avoid continued fruitless attempts if failure occurs at either block 712 or 718, then the determinations at blocks 704 and 708 will indicate time to use an approach with a higher likelihood of acquisition success. In block 724, a full-window CPICH is search is performed blindly without benefit of perhaps inaccurate slot timing information. If in block 726 peaks are not found, then additional retries are made by returning to block 714, if successful, then decoding of the BCH occurs in block 720.

Figure 8:
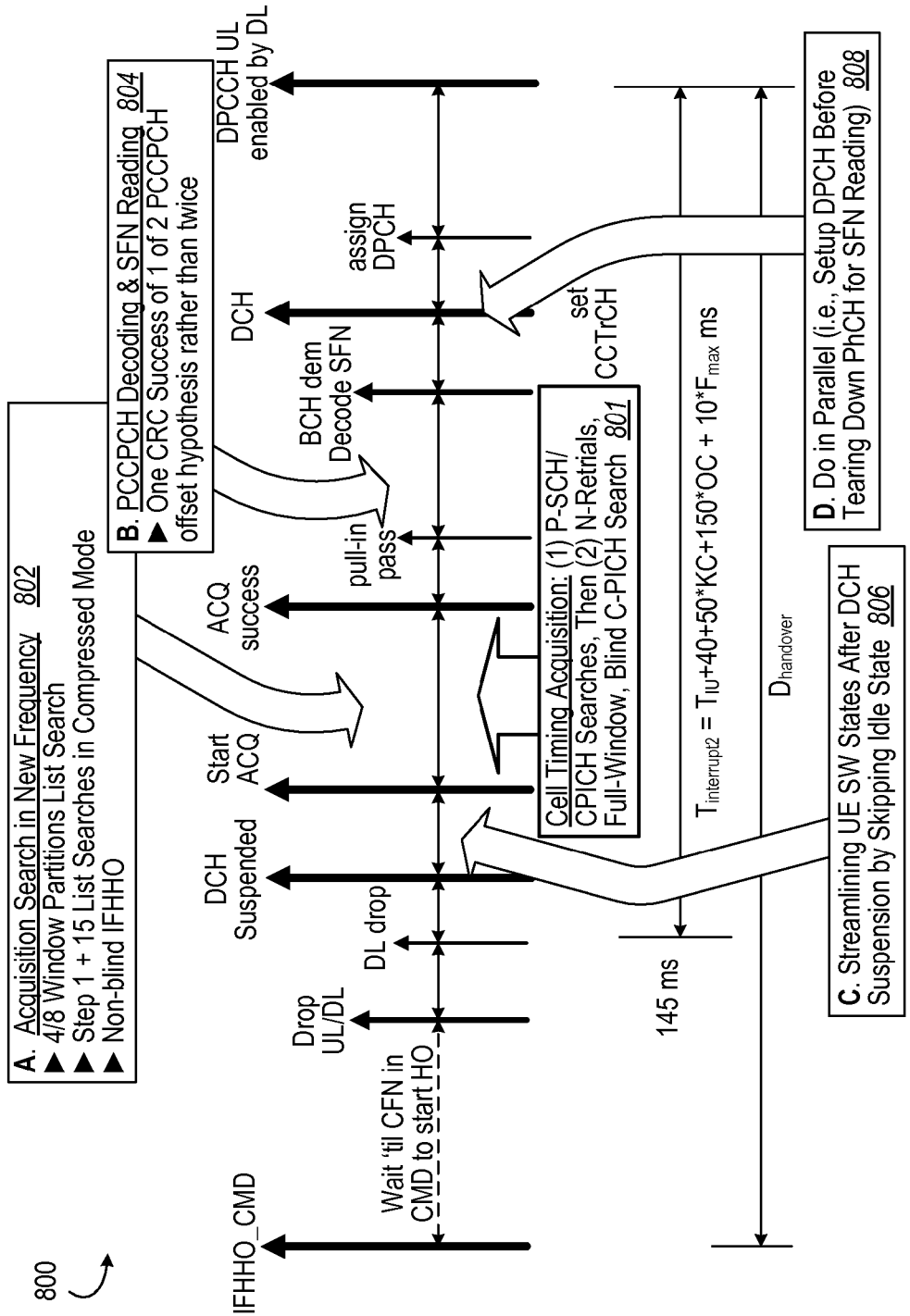
FIG. 8 illustrates a timing diagram for optimizations of cell timing acquisition in a WCDMA hard handover.

In FIG. 8, cell timing acquisition 801 in a WCDMA hard handover can be further shortened even if successful in acquiring by use of P-SCH followed by CPICH searched with timing information. Inter-frequency hard handover (IFHHO) procedure (IFHHO) is initiated from UTRAN with a RRC message that implies a hard handover. When the UE receives a RRC message implying hard handover with the activation time "now" or earlier than $D_{handover}$ seconds from the end of the last TTI containing the RRC command, the UE shall be ready to start the transmission of the new uplink DPCCH within $D_{handover}$ seconds from the end of the last TTI containing the RRC command.

With regard to DPCCH, the Dedicated Physical Control Channel is a term from UMTS. This is the physical channel on which the signaling is transmitted, both on the uplink by the UE (user equipment) to the Node B (the base transceiver station) and on the downlink by the Node B to the UE.

With regard to TTI, Transmission Time Interval, is a parameter in UMTS (and other digital telecommunication networks) related to encapsulation of data from higher layers into frames for transmission on the radio link layer. TTI refers to the length of an independently decodable transmission on the radio link. The TTI is related to the size of the data blocks passed from the higher network layers to the radio link layer. To combat errors due to fading and interference on the radio link data is divided at the transmitter into blocks and then the bits within a block are encoded and interleaved. The length of time required to transmit one such block determines the TTI. At the receiver all bits from a given block must be received before they can be deinterleaved and decoded. Having decoded the bits the receiver can estimate the bit error rate (BER). And because the shortest decodable transmission is one TTI the shortest period over which BER can be estimated is also one TTI. Thus in networks with link adaptation techniques based on the estimated BER the shortest interval between reports of the estimated performance, which are used to adapt to the conditions on the link, is at least one TTI. In order to be able to adapt quickly to the changing conditions in the radio link a communications system must have shorter TTIs. In order to benefit more from the effect of interleaving and to increase the efficiency of error-correction and compression techniques a system must, in general, have longer TTIs. These two contradicting requirements determine the choice of the TTI.

If the access is delayed to an indicated activation time later than $D_{handover}$ seconds from the end of the last TTI containing the RRC command, the UE shall be ready to start the transmission of the new uplink DPCCH at the designated activation time.

Interruption time. $D_{handover}$ equals the RRC procedure delay defined in TS25.331 Section 13.5.2 plus the interruption time. The interruption time, i.e. the time between the last TTI containing a transport block on the old DPDCH and the time the UE starts transmission of the new uplink DPCCH, is depending on whether the target cell is known for the UE or not.

If IFHHO is commanded and the UE needs compressed mode to perform inter-frequency measurements, the interruption time shall be less than Tinterrupt2:

$$T_{interrupt2}=T_{IU}+40+50*KC+150*OC+1*F_{max} \text{ ms}$$

where $T_{IU}$ is the interruption uncertainty when changing the timing from the old to the new cell. $T_{IU}$ can be up to one frame. KC is the number of known target cells in the message, and OC is the number of target cells that are not known in the message. $F_{max}$ denotes the maximum number of radio frames within the transmission time intervals of all transport channels that are multiplexed into the same CCTrCH (Coded Composite Transport Channel). The figure 40 ms is the time required for measuring the downlink DPCCH channel as stated in TS 25.214 section 4.3.1.2. In the interruption requirement $T_{interrupt2}$ a cell is known if the cell has been measured by the UE during the last 5 seconds. The requirements here assume that N312 has the smallest possible value i.e. only one insync is required.

Acquisition search in new frequency. In blind IFHHO, a list search is done over the whole frame to find peaks. Another way is to do the initial search based on P-SCH to find the slot timing and if successful followed by 15 list searches as in compressed mode inter-frequency cell search.

PCCPCH decoding and SFN reading. SFN (Cell System Frame Number) is used in the UMTS system to identify the framing and timing of a cell on a Node B. After pull-in success, UE assign physical channels for PCCPCH demodulation and read SFN. Conventionally, to decide the start of PCCPCH TTI boundary, two physical channels are assigned with alternative offset hypothesis. CRC passing criteria are twice checked for passing a threshold before declaring synchronization of PCCPCH and successfully read SFN. This process takes time in decoding and in waiting for the frame boundary within the total time between pull-in success and SFN read success. This time can be reduced by defining the success criteria during IFHHO as depicted at 804 by being only one hypothesis passing CRC once and the other hypothesis failed. If either both passed or both failed, a second check is performed to decide. With this change alone, the time can be reduced.

Procedures between suspending DCH to start of acquisition search. After suspending DCH, conventionally the UE goes into SW IDLE state and then ACQ state to start acquisition. Although these are only software states, it seems there is some delay during these transitions doing initializations in these states. Transfer directly from DCH to ACQ state can reduce this delay of ~5 ms or more as depicted at 806.

Procedures between SFN read and assigning DPCH in DCH. After successfully reading SFN, conventionally, the UE proceeds by deactivating and reactivating the SFN reading channels and performing physical channel (PhCH) CCTrCH setup for PCCPCH (BCH). Then, the UE enters DCH and starts to assign PhCH for DPCH. These two processes took 15 ms and 14 ms respectively. Advantageously, by setting up these two sets of channels in parallel, i.e., setup DPCH before tearing down the PhCH for SFN reading, the $T_{interrupt2}$ delay can be reduced by another ~10 ms.

Figure 9:
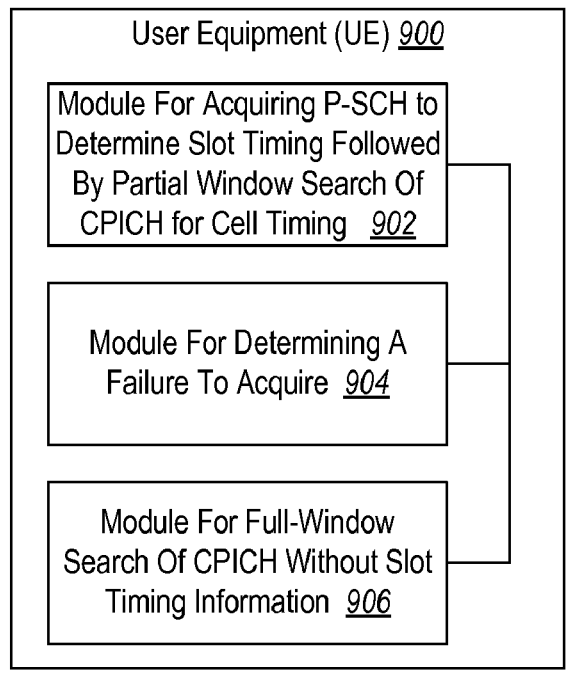
FIG. 9 illustrates a block diagram of user equipment (UE) having modules configured to cause a computer to perform the functions for assisting in reducing downlink delays during handover.

In FIG. 9, in another aspect, user equipment 900 includes modules that provide a means to cause a computer to perform inter-frequency hard handover in a challenging channel quality environment. A module 902 provides for attempting to acquire a synchronization channel of a target base node to determine slot timing followed by a partial window search of a common pilot channel to determine cell timing. A module 904 provides for determining a failure to acquire the target base node. A module 906 provides for performing a full-window search of the common pilot channel (CPICH) blindly without slot timing information in order to acquire the target base note with a higher success rate during hard handovers without a uniform increase of time spent in cell timing acquisition.

Figure 10:
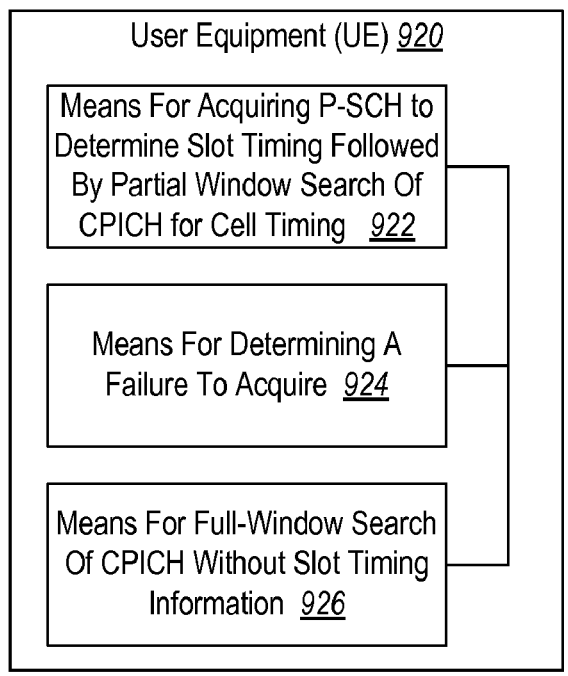
FIG. 10 illustrates a block diagram of user equipment (UE) having means to perform the functions for assisting in reducing downlink delays during handover

In FIG. 10, in another aspect, user equipment 920 includes a means to cause a computer to perform inter-frequency hard handover in a challenging channel quality environment. A means 922 provides for attempting to acquire a synchronization channel of a target base node to determine slot timing followed by a partial window search of a common pilot channel to determine cell timing. A means 924 provides for determining a failure to acquire the target base node. A means 926 provides for performing a full-window search of the common pilot channel (CPICH) blindly without slot timing information in order to acquire the target base note with a higher success rate during hard handovers without a uniform increase of time spent in cell timing acquisition.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict data traffic conditions and opportunities for facilitating handover to another type of RAT with reduced latency and connection errors based on previous interactions with the same or like machines under similar conditions.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for inter-frequency hard handover comprising:
    attempting to acquire a synchronization channel of a target base node to determine slot timing followed by a partial window search of a common pilot channel to determine the cell timing;
    determining a failure to acquire the target base node;
    performing a full-window search of the common pilot channel (CPICH) blindly without slot timing;
    attempting to acquire the synchronization channel by, using a primary synchronization code to acquire slot synchronization to the target base station;
    determining a primary scrambling code by symbol-by-symbol correlation over the narrow window of the code group;
    performing the full-window search of the common pilot channel (CPICH) by, performing a plurality of retrials to find peaks in the CPICH;
    coding broadcast channel based on the found peaks; and
    acquiring the target base station when determining that satisfies cyclic redundancy check (CRC).

2. The method of claim 1, further comprising performing the full-window search of the common pilot channel (CPICH) by,
    performing a plurality of retrials to find peaks in the CPICH; coding broadcast channel based on the found peaks; and acquiring the target base station when determining that satisfies cyclic redundancy check (CRC).

3. The method of claim 1, further comprising reducing handover delay by transitioning directly from a state suspending dedicated channel (DCH) to an acquisition state.

4. The method of claim 1, further comprising performing blind inter-frequency hard handover by performing a list search over a whole frame to find peaks by partitioning the whole window size to 4 or 8 with 4 list searches performed in parallel.

5. The method of claim 4, further comprising subsequently performing 15 list searches in compressed mode.

6. The method of claim 1, further comprising: after acquisition pull-in success, assigning physical channels for Primary Common Control Physical Channel (PCCPCH) demodulation and reading sequence frame number by assigning two physical channels with alternative offset hypothesis; checking cyclic redundancy check (CRC) passing criteria for PCCPCH demodulation; and declaring synchronization of PCCPCH and a successfully read SFN by defining success criteria to be one hypothesis passed CRC once and the other hypothesis failed.

7. The method of claim 1, further comprising: after successfully reading sequence frame number (SFN), setting up physical channel (PhCH) Coded Composite Transport Channel (CCTrCH) for Common Control Physical Channel (PCCPCH); and in parallel entering dedicated channel (PhCH) to assign physical channel (PhCH) for dedicated physical channel (DPCH).

8. At least one processor for inter-frequency hard handover comprising:
    a first module for attempting to acquire a synchronization channel of a target base node to determine slot timing followed by a partial window search of a common pilot channel to determine cell timing;
    a second module for determining a failure to acquire the target base node;
    a third module for performing a full-window search of the common pilot channel (CPICH) blindly without slot timing;
    a fourth module for attempting to acquire the synchronization channel by, using a primary synchronization code to acquire slot synchronization to the target base station;
    a fifth module for determining a primary scrambling code by symbol-by-symbol correlation over the narrow window of the code group;
    a sixth module for performing the full-window search of the common pilot channel (CPICH) by, performing a plurality of retrials to find peaks in the CPICH;
    a seventh module for coding broadcast channel based on the found peaks; and
    an eighth module for acquiring the target base station when determining that satisfies cyclic redundancy check (CRC).

9. A computer program product for inter-frequency hard handover comprising:
    a non-transitory computer-readable storage medium comprising, a first set of codes for causing a computer to attempt to acquire a synchronization channel of a target base node to determine slot timing followed by a partial window search of a common pilot channel to determine cell timing;
    a second set of codes for causing the computer to determine a failure to acquire the target base node;
    a third set of codes for causing the computer to perform a full-window search of the common pilot channel (CPICH) blindly without slot timing;
    a fourth set of codes for attempting to acquire the synchronization channel by, using a primary synchronization code to acquire slot synchronization to the target base station;
    a fifth set of codes for determining a primary scrambling code by symbol-by-symbol correlation over the narrow window of the code group;
    a sixth set of codes for performing the full-window search of the common pilot channel (CPICH) by, performing a plurality of retrials to find peaks in the CPICH;
    a seventh set of codes for coding broadcast channel based on the found peaks; and
    an eighth set of codes for acquiring the target base station when determining that satisfies cyclic redundancy check (CRC).

10. An apparatus for inter-frequency hard handover in comprising:
    means for attempting to acquire a synchronization channel of a target base node to determine slot timing followed by a partial window search of a common pilot channel to determine cell timing;
    means for determining a failure to acquire the target base node;
    means for performing a full-window search of the common pilot channel (CPICH) blindly without slot timing;
    means for attempting to acquire the synchronization channel by, using a primary synchronization code to acquire slot synchronization to the target base station;

means for determining a primary scrambling code by symbol-by-symbol correlation over the narrow window of the code group;

means for performing the full-window search of the common pilot channel (CPICH) by, performing a plurality of retrials to find peaks in the CPICH;

means for coding broadcast channel based on the found peaks; and means for acquiring the target base station when determining that satisfies cyclic redundancy check (CRC).

11. An apparatus for inter-frequency hard handover in comprising:
- a receiver configured to perform an attempting to acquire a synchronization channel of a target base node to determine slot timing followed by a partial window search of a common pilot channel to determine cell timing;
- a controller configured to determine a failure to acquire the target base node,
- wherein the receiver is further configured to perform a full-window search of the common pilot channel (CPICH) blindly without slot timing;
- attempting to acquire the synchronization channel by, using a primary synchronization code to acquire slot synchronization to the target base station;
- determining a primary scrambling code by symbol-by-symbol correlation over the narrow window of the code group;
- performing the full-window search of the common pilot channel (CPICH) by, performing a plurality of retrials to find peaks in the CPICH;
- coding broadcast channel based on the found peaks; and
- acquiring the target base station when determining that satisfies cyclic redundancy check (CRC).

12. The apparatus of claim 11, wherein the receiver is further configured to perform the full-window search of the common pilot channel (CPICH) by: performing a plurality of retrials to find peaks in the CPICH; coding broadcast channel based on the found peaks; and acquiring the target base station when determining that satisfies cyclic redundancy check (CRC).

13. The apparatus of claim 11, wherein the receiver is further configured for to transitioning directly from a state suspending dedicated channel (DCH) to an acquisition state, for reducing handover delay.

14. The apparatus of claim 11, wherein the receiver is further configured to perform blind inter-frequency hard handover by performing a list search over a whole frame to find peaks by partitioning the whole window size to 4 or 8 with 4 list searches performed in parallel.

15. The apparatus of claim 14, wherein the receiver is further configured to subsequently perform 15 list searches in compressed mode.

16. The apparatus of claim 11, wherein the receiver is further configured to: after acquisition pull-in success, assign physical channels for Primary Common Control Physical Channel (PCCPCH) demodulation and read sequence frame number by assigning two physical channels with alternative offset hypothesis;
- check cyclic redundancy check (CRC) passing criteria for PCCPCH demodulation; and declare synchronization of PCCPCH and a successfully read SFN by defining success criteria to be one hypothesis passed CRC once and the other hypothesis failed.

17. The apparatus of claim 11, wherein the receiver is further configured to: after successfully reading sequence frame number (SFN), set up physical channel (PhCH) Coded Composite Transport Channel (CCTrCH) for Common Control Physical Channel (PCCPCH); and in parallel enter dedicated channel (PhCH) to assign physical channel (PhCH) for dedicated physical channel.

* * * * *